3,669,739
PROCESS FOR RECOVERY OF STARCH AND GLUTEN BY WASHING A DOUGH OF WHEAT FLOUR

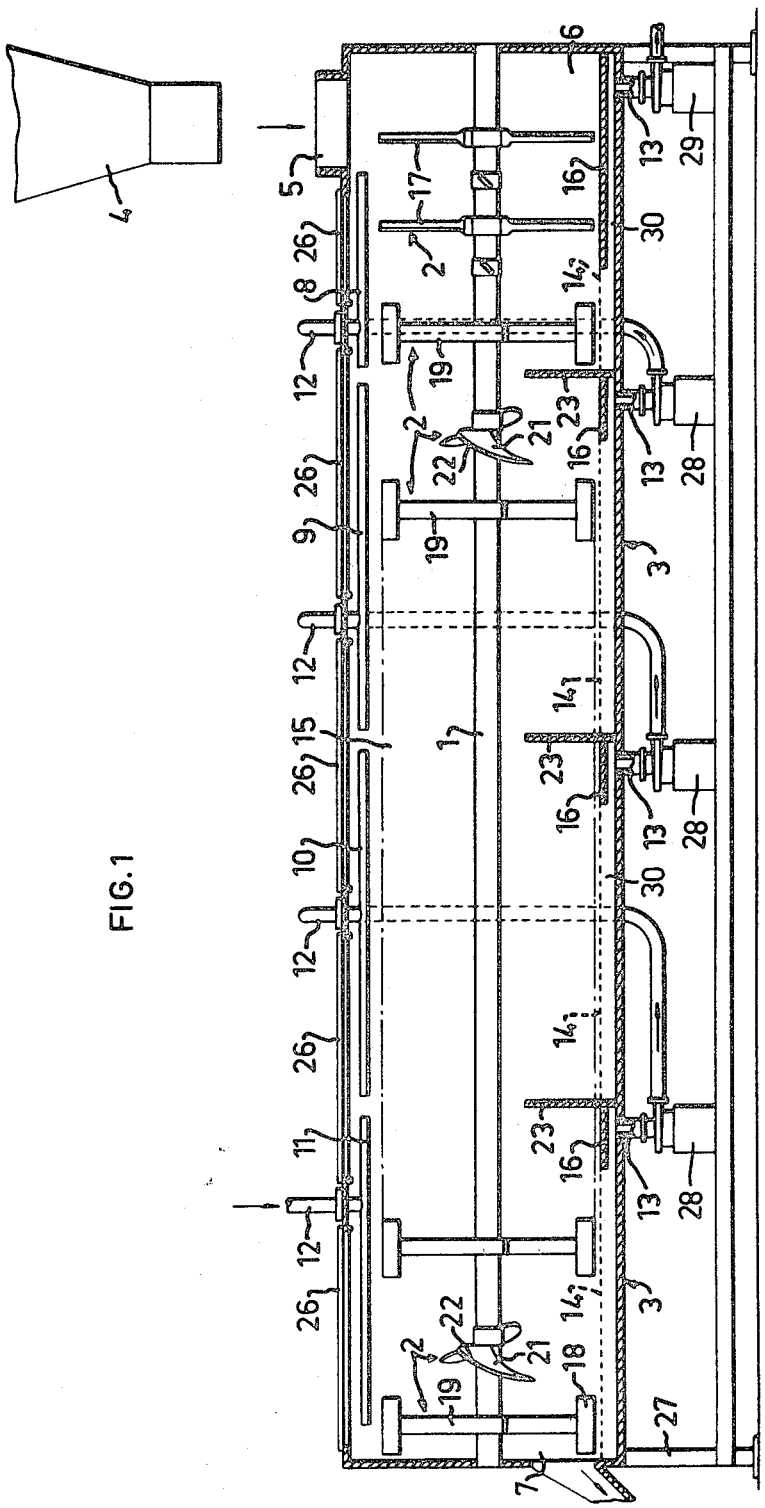

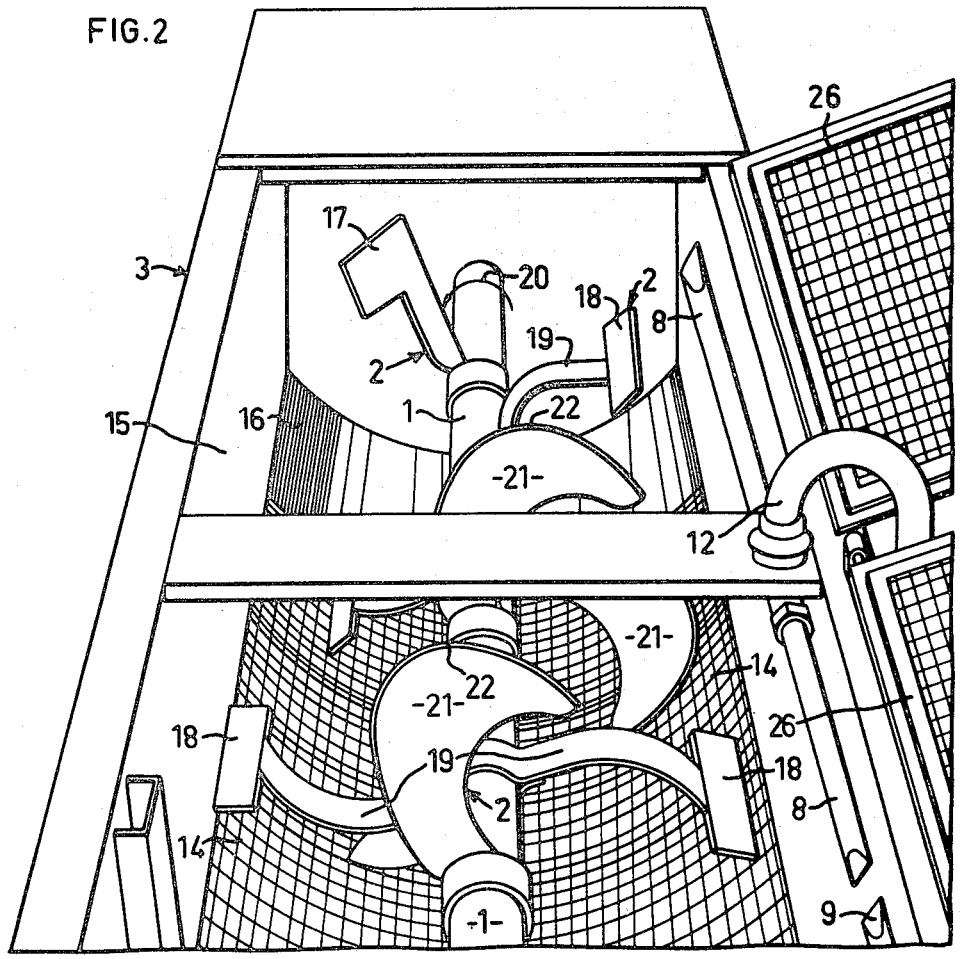

Erik Plaven, Scheelegatan 1, Stockholm K, Sweden
Continuation-in-part of applications Ser. No. 476,128 and Ser. No. 476,129, both July 30, 1965. This application June 15, 1970, Ser. No. 46,469
Claims priority, application Sweden, Aug. 4, 1964, 9,413/64
Int. Cl. C131 1/02
U.S. Cl. 127—67                 8 Claims

ABSTRACT OF THE DISCLOSURE

A process for recovery of wheat starch and gluten from a dough of wheat flour, as compared with all other flour starches, by simultaneously mechanically treating and spray washing the dough with a starch absorbing liquid, the latter of which is quickly carried away from the recovery region so as to preclude an undue build-up of wash liquid, with the dough being subjected to repeated shredding and cutting actions by the improved disposition and use of improved scrapers, spreading and cutting members revolving with a rotatable shaft extending axially within a perforated semi-circular troughed treatment zone, whereby the gluten network of the dough mix is more efficiently broken down, and the starch is washed therefrom, and the reformed gluten lumps respectively being recovered in different areas for further predetermined treatment or commercial use.

---

This application is a continuation-in-part of applicant's pending application Ser. No. 476,129 filed July 30, 1965, now abandoned, and of application Ser. No. 476,128 also filed July 30, 1965, now the subject of U.S. Pat. No. 3,506,485, issued Apr. 14, 1970.

BACKGROUND OF THE INVENTION

This invention relates to a process for the recovery of starch and gluten from a dough of wheat flour, where the dough is treated by supply starch-absorbing liquid by which the starch is carried away from the recovery region, the gluten accumulating into lumps, and to the related apparatus for carrying out this process, comprising a generally semi-circular, at least partly perforated trough, improved treatment means provided in said trough for rotation about a shaft extending longitudinally of the trough, means for supply water, and means for discharging the water and the starch absorbed thereby via the perforations, with the dough being introduced at one end and the gluten being discharged at the other end.

The process for manufacturing starch and gluten from a dough of wheat flour and water differs entirely from all other starch manufacturing processes. The reason for this is the rather special physical properties of the wheat gluten. This gluten, about 8–17% of the flour, swells during the mixing process of wheat flour with water and forms a network of a cellular pattern where the gluten forms the "cell" walls and the starch fills the "cells." The hydrated or swollen gluten is very elastic and this property is utilized when leavening the dough for bread baking. When the yeast transfer some of the starch granules into alcohol, carbon dioxide gas is formed and expands the "cells." The elastic gluten walls prevent the gas from escaping and a fluffy and easier digestable bread can be baked.

When separating the gluten and starch from the wheat dough, water is used for washing the starch away. In the unwashed dough, the gluten is dispersed as a very thin network. Whereas the starch particles have a defined size and shape, the gluten has neither of these qualifications. It is, however, very sticky in relation to other gluten particles, which property makes it possible to collect the gluten in the form of gluten lumps in screening means, while the starch is washed through the screen by means of the washing liquid.

Knowing these facts it is understood that when starch and gluten are to be extracted from a dough of wheat flour and at the same time separated from each other, two contradictory conditions must be taken into consideration: firstly, that the gluten should accumulate as quickly as possible in order that the gluten losses may be kept small, and secondly that the gluten network mentioned above should be ruptured in order that starch granules embedded in this network can be treated with water. These contradictory conditions have so far necessitated a labor-consuming and lengthy, and therefore costly, treatment, as well as a raw material of high quality, or considerable sacrifices have had to be made in the yield of gluten and in the quality of the starch produced.

Continuous processes, reducing especially the treatment time, have been introduced comprising a more or less complete dispersion of the dough in the wash water and recovering the gluten on vibrating or rotating screens covered with a very fine screen mesh, 100 microns or finer. These screens require, however, much cleaning and maintenance, and due to the large screening area needed, the contact between products and air is considerable, thereby easily resulting in undue bacteria action and breaking down especially of the gluten. Further, this system requires a comparatively "hard" type of flour to be used, that is, a flour having a high percentage of gluten, and this gluten being of a more stable type than the gluten contained in so-called "weak" flours. When using weak flours for this type of process, the losses of gluten would be considerable due to dissolving part of the gluten and undue foaming difficulties and the starch extracted from the dough would need much more purification in order to obtain the desired purity.

It has also been tried to use processes and various apparatuses similar to those being used for extraction of starch from potatoes, cassava, corn, rice, etc., but due to the very different properties of the wheat gluten, none of these systems have worked. Therefore, as an axample, it is not possible to use chemicals such as, for instance, sulphur dioxide, which is otherwise commonly used in starch processing in order to stop or check bacterial action. These chemicals would denature or modify the wheat gluten. Brushes cannot be used for cleaning screen plates or aiding in the extraction of starch from the dough as they would be filled immediately with the very sticky chewing-gum like gluten. The brush would further act as an ideal place for bacterial growth and, in addition, mechanically the brush tips would adversely disintegrate the gluten or dough into too small particles, and then brush these particles through the perforation together with the starch. It is important in applicant's process for treating wheat dough that the dough is not broken up too finely so as to avoid a suspension of the dough particles in the wash liquid.

Other continuous or semi-continuous processes have been used comprising the dough being broken by agitating or squeezing means when submerged in water. These methods try to use the same extraction methods as in the old discontinuous methods, but also have the same drawbacks, that is, long treatment time and long contact time with the wash liquid, making it practically impossible to re-use water already used in the process because such water contains gluten-attacking enzymes and has also other properties with detrimental effect on the gluten.

Even in the methods and apparatus as hitherto known for extracting starch and gluten from a dough of wheat flour, it has been necessary to use a high-quality flour, but in spite of the high flour quality it has not been possible to obtain a high yield and quality of the products without incorporating unduly lengthy and labor consuming and thus rather costly treatment. The extraction process suggested by the present invention makes it possible to reduce the treatment time considerably, even when using a low-grade flour whereby labor is reduced to a minimum, i.e. for supervision only.

SUMMARY OF THE INVENTION

The process according to the invention is characterized in that the lumps of gluten, to uncover starch granules embedded in each lump, are subjected to a repeated cutting and spreading operation in various directions within a perforated troughed treatment zone and of a nature such that the gluten lumps are shredded, cut and flattened by improved treatment means and the gluten network thereby ruptured, whereby small gluten particles or gluten lumps present in the perforations of said zone and not otherwise caught then stick to and are absorbed by or reformed with the gluten or gluten lumps being pushed through the treatment zone, and thereby enabling the added or recycled wash liquid therein to discharge from the treatment zone without forming any noticeable liquor or wash liquid level. The gluten is allowed to largely resume its lump shape after said various cutting and spreading operations.

The improved process embodies improved apparatus which is characterized by the fact that the treatment means are in the form of improved stirring rods, scrapers and sabres arranged and used in an improved manner, and that the trough is perforated substantially throughout the extension of the sections, where the trough is concentric with the shaft of the scrapers and sabres and thus broadly parallel with the paths of rotation of the rods and the scrapers, all such that the scrapers and sabres during their rotation in the trough and around the shaft have edges facing the trough section, at least some of which edges extend in an inclined relation to the shaft and some of the treatment means, as seen in a transverse direction, are disposed at an acute angle to the trough section, and which edges may catch gluten particles and gluten lumps and carry them through the trough in the transverse direction, and further lift the gluten lumps out of the trough at one side thereof and let them fall back into the trough adjacent thereto and at the other side thereof, and that water supplied to the trough is discharged through the scraper-cleared perforations without causing any essential water accumulation in the trough.

DESCRIPTION OF THE DRAWINGS

The invention will be described in detail in the following, reference being made to the accompanying drawings.

In the drawings:

FIG. 1 is a longitudinal section of an apparatus for carrying out and effecting the process of the invention;

FIG. 2 is a perspective view from above of one end of a trough comprising part of the process apparatus; and FIGS. 3 and 4 schematically show facets of the process according to the invention.

A PREFERRED EMBODIMENT

The rotating shaft 1 of the device, shown in the drawings, for the recovery of starch and gluten by treating a dough with liquid, has treatment means which are generally designated 2 and are fastened to the shaft for working and conveying the dough transversely and longitudinally of the wholly or partly perforated bottom of the trough 3. Wheat flour intended for the recovery of starch and gluten is mixed with water and worked to a plastic but still firm dough which thereafter, possibly after a certain period of swelling in a tank 4, is introduced through an opening 5 into the feed end 6 of the trough. The gluten subsequently remaining after the dough has been processed and freed from the starch during the treatment in the trough 3 is discharged through the discharge end 7 of the trough. The treatment in the trough 3 may be regarded both as a prewashing and a complete washing operation where the greater part of the starch is separated from the gluten due to the large degree of efficiency from the process and apparatus. From this discharge end 7, the gluten may be possibly sent to further devices for final washing and separation of practically all remaining starch. These further devices are not comprised in this invention, and will therefore not be described herein.

During the washing treatment in the trough 3, the dough may be sprayed with fresh water, although it is more economically sprayed with so-called starch milk, i.e. water which has already been used one or several times for washing the dough in the trough 3 or possibly in following washing devices. This liquid is introduced through spray pipes 8, 9, 10 and 11 in the top part of the trough. The liquid is fed to the spray pipes 8–11 through pipes 12 by pump means 28 associated with said pipes 12. The washing liquid with suspended starch is discharged from the trough 3 via collectors 30 through pipes 13 and pump means 29 incorporated with said pipes 13 to devices (not shown) for separating the starch from the wash liquid. The pipe 13 from the trough section sprayed by the spray pipe 11 may be connected to the spray pipe 10, and the pipe 13 from the trough section sprayed by the spray pipe 10 may be connected to the spray pipe 9, etc. By this arrangement, the amount of water needed is reduced, and the small gluten particles, possibly passed through the perforation and carried by the wash liquid, are returned to the treatment compartment of the trough 3. The use of starch milk in this way as wash liquid has not previously been possible in the earlier stages of the dough washing process, especially not when low-grade flour has been used.

Additionally the milk starch may be directed through suitable cleaning means (not shown) to cleanse and separate most of the starch from the milk liquid before recycling the wash liquid for reuse in the process.

The trough 3 is perforated practically all along the section 14, which is concentric with the shaft 1, and thus broadly parallel to the rotation circle of the treatment means 2. With the exception of its very beginning at the feed end, where it suitably and preferably should be imperforate, the trough 3 is perforated mainly along its entire length, i.e. in the sections 14 where the trough is concentric with the shaft 1. In other words, the vertical sides 15 of the trough 3, as shown in the figures, are not perforated since perforations in these vertical sections would have no influence on the treatment. However, for the utilization of the invention, the trough 3 need not be perforated along its entire length between the feed end 6 and the discharge end 7, but it may be suitable to let perforated sections 14 alternate with imperforate sections 16, as shown in the figures. A very acceptable example of the gauge or thickness of the trough is one of from approximately 1/32"–1/64" thick, with perforations of about 0.025" or between 1/32 and 1/64 inch.

The treatment means 2 are somewhat different in shape for securing the best possible treatment of the dough fed to the trough and the gluten, which latter consists of the dough from which more or less starch has been separated. Common to all treatment means 2 is, however, that they project close to the semicircular trough parts 14 and 16 and they have an edge facing the sections of the trough 3, which sections are concentric with the shaft 1. At the feed end 6 of the trough 3, where the trough is preferably imperforate, the main object of the treatment means 2 is to tear and divide the dough into lumps of suitable size for the following treatment. Therefore, at the feed end 6 the treatment means 2 are in the shape of stirring rods 17 radially secured to the shaft 1. In the perforated sections 14 of the trough 3, the treatment means 2 are in the shape of sabres 21 and of blade-type scrapers 18, or transfer and lifting means, the blades of which are mainly parallel and radial to the shaft 1. The direction of the scraper blades 18 may, however, deviate somewhat from the parallelism with the shaft 1 in order that the blades may have a slight pushing action on the dough or gluten towards the discharge end 7. The combined length of the blades 18 and 21 in their extension parallel to the shaft 1 corresponds mainly to the extension of section 14 in the same direction. For practical reasons, several scrapers and sabres are arranged along the shaft to cover the full length of the extension of the perforated section in parallel with the shaft. During their rotation in the direction shown by arrow 20 in FIG. 2 the scrapers 18 catch gluten lumps and push them along the curve of the perforated plate and lift them until they fall back onto the trough bottom. During the treatment, the gluten lumps are caught several times by the scrapers 18, lifted and returned to the bottom of the trough 3, while being slowly conveyed towards the discharge end 7 of the trough 3 due to the slight angularity of the blades relative to the shaft axis. When the gluten lumps are pushed along the curve of the perforated plates, due to their sticky characteristic, they absorb gluten particles which are too small to be caught by the scraper blades and such gluten particles as are sticking in the perforations. Through this action, the perforation is kept open so that the wash liquid can be discharged without accumulating in the treatment area. It is very important that the wash liquid be drained off continuously from the perforated plate, for if the gluten lumps pushed along the curve of the screen plate are submerged in water, they will not have sufficient absorption power to catch and merge with the small particles sticking in the perforations or suspended in the wash liquid. Moreover, it is important not to break up the dough too much and to avoid a suspension of fine particles in a large amount of liquid.

The action of absorbing the gluten particles sticking in the perforations is further increased by the gluten lumps being pressed against the perforated plate by the scraper blades. When leaving the feed end 6 of the trough, the dough is still greasy due to its starch content and wet surface, and here it is even more important that the perforation is kept open by scraper blades, and therefore such scrapers 18 are preferably fastened to the shaft 1 at the first part of the trough. It is apparent and important that the primary function of the scrapers is to move and clear away the dough and gluten lumps and by the inherent tacky characteristic of the gluten which remains after much of the starch has been washed out, it naturally causes the smaller particles and lumps to adhere and unite with the larger lumps being moved by the blades to the extent that they pull the smaller particles away from perforations to keep a sufficient area of the perforated trough open to allow the quick draining away of the wash liquid.

The scrapers 18 are preferably arranged at an angle of about 90° with respect to the nearest stirring rods so as not to interfere with the stirring and tearing action of the stirring rods. The scrapers 18 are very important for a troublefree working of the apparatus. The scrapers 18 are connected to the shaft 1 by means of arms or connecting rods 19 bent to the form of an arc, the arc being situated in front of the scraper blade 18 in relation to the direction of rotation as shown by arrow 20 (FIG. 2). This shape of the connecting rods prevents the gluten lumps from sliding along the rods down to the shaft 1 and winding themselves around the shaft and makes them fall off between the shaft 1 and the trough sides.

Sabre-like treatment means 21 are also fastened to the shaft 1. The edge 22 of the sabres 21 is turned towards the semi-circular bottom of the trough and runs at an angle to the shaft 1, the main planes of the sabres forming an acute angle to the curve of the bottom of the trough 3. The sabres 21 may be fitted both in the perforated sections 14 and the imperforate sections 16. The mode of operation of the sabres 21 is entirely different from that of the scrapers 18, in that the sabres cut, shred and/or pinch the gluten lumps between the edge and trough bottom 14 and 16, thus shredding the gluten lumps so that the lumps are opened and better exposed to the washing liquid, the result being that starch granules embedded in the lumps are uncovered and can be washed away from the gluten by means of the wash liquid fed to the trough through the spray pipes 8, 9, 10 and 11. In order that the starch granules may be exposed to the wash liquid, the lumps are thus subjected to repeated cutting, shredding and temporary or partial flattening in different directions, as the gluten lumps are repeatedly introduced into and pushed out of the treatment area, thereby constantly changing their positions. Each time the shredded gluten slides or moves back onto the trough bottom and slides of rolls along this bottom, it regains its lump shape due to the inherent tacky characteristic of the gluten mass, whether of small or large size. The flattening and shredding action according to the invention which the gluten lumps are subjected to is shown in FIGS. 3 and 4 in which, for the sake of simplicity, the bottom of the trough is shown as a straight line and the treatment means 21 as a rectangular blade inclined transversely and longitudinally to some extent.

The combined action of the scrapers 18 and the sabres 21 increases the efficiency of the treatment of the gluten and the dough. Tests have proved that this combined action of the scrapers 18 and the sabres 21, each with a different mode of operation, is of the utmost importance to the utilization of the invention. As the sabres 21 cut large gluten lumps into smaller pieces and further shred the lumps against the trough walls, the lumps are reduced to a size suitable for the washing treatment in and transport along the trough to the discharge end. It is of advantage if the treatment means 18 and 21 are adjustable along the shaft 1 as well as at an angle in relation to each other. Owing to the repeated cutting, shredding, flattening, and rolling as by blades 21 and 18 in different directions, the starch granules embedded in the gluten are exposed and washed off by the washing liquid.

By using a suitable number of treatment means 21 in relation to the number of scrapers 18, usually more sabres than scrapers, it is possible to obtain a quick and efficient separation of starch and gluten with a relatively small amount of wash liquid in a relatively short trough of approximately 20 to 30 feet in length, and to have the starch and water discharge practically free from gluten.

It is mostly preferable to utilize more scrapers 18 than sabres 21 at the beginning end with a decreasing number of scrapers and an increasing number of sabres toward the discharge end thereof.

The trough 3 is preferably divided into compartments by means of dividing walls 23 over which the gluten lumps are lifted by means of the treatment means, and the trough may be covered with lids 26 and mounted on legs 27. The dividing walls 23 serve to retard the flow of dough lumps through the axial length of the trough to more thoroughly subject the lumps to the repeated steps of cutting, shredding, lifting and reforming thereof. Additionally, and/or alternatively, at least one or more of the sabre cutting blades 21 can be mounted in a reverse manner for achieving a generally similar retarding screw effect.

The process of this invention is often able to be successfully completed in as little time as approximately 10 minutes, and should usually be fully completed within one-half hour. The treated lumps should not be subjected to treatment for a period of more than from about ½ to 1 hour, because the gluten will start to dissolve and fluidize, and adverse bacterial and enzymatical actions commence.

The advantage of considerable saving of space and labor while increasing the efficiency of wheat flour treatment starch and gluten extraction is most important, with the ever increasing costs of construction and/or rental of suitable factory space, and of labor costs.

The principle of the invention is not confined only to what is described above, but may be embodied in various steps and forms within the scope of the appended claims.

What is claimed is:

1. A wheat flour dough washing process for separating starch graunles from gluten by improving working and water spraying of the dough which comprises the steps of:

(a) introducing a mainly continuous flow of wheat flour dough into one end of an elongated treating zone comprising at least partially perforated trough portions having working and receiving areas therein, and initially stirring same at the introducing end to break up the dough into lumps;

(b) introducing a wash liquid into and along said treating zone for washing out and removing starch from the dough lumps, without an undue collection of the liquid in said treating zone, thereby assuring maximum supporting contact of the dough mass and lumps with said perforated trough to increase the efficiency of its treatment;

(c) subjecting said lumps of dough to repeated and progressive steps of pushing and moving, cutting and shredding operations by a plurality of different axially spaced and circumferentially offset radially extended non-brush type working members including cutting sabres and pushing paddles disposed angularly to also impart transporting movement to the dough lumps through the treatment zone, which steps occur progressively in a combined radial and axial direction to progressively cut and shred the gluten lumps to expose large areas thereof to be washed by said liquid to remove and flush off the starch;

(d) simultaneously pushing and lifting at least part of said dough and gluten lumps by a plurality of radially and axially spaced rotating scraper blades to move said lumps along said perforated trough surface in the combined radial and axial manner within the treating zone, including:

(1) lifting said lumps out of the zone at one side and dropping them back into said treatment zone;

(2) non-brush type cleaning of the trough perforations by said pushing to help effect and facilitate both the quick draining away of said wash liquid and the reclaiming of gluten particles from the perforations of the trough for reforming with the said lumps being pushed; and (3) reforming the cut and shredded lumps into sufficiently larger lumps to enable them to be subjected to the repeated steps of cutting and shredding; and (e) continuously carrying away and discharging said wash liquid with the starch particles contained therein from the working and recovery areas to preclude said undue liquid level build-up, and said dough and lumps being precluded from being continuously immersed in the wash liquid to thereby assure sufficient absorption characteristics to the lump particles to facilitate and assure their being reclaimed and reformed into lump form to be subjected to the said repeated steps.

2. The process as defined in claim 1 further including the step of collecting said discharge wash liquid and passing it through separating means for separating the starch suspended therein from said wash liquid to cleanse same.

3. The process as defined in claim 2 further including the step of recirculating the cleansed wash liquid for reintroduction into the treating zone to be used again.

4. The process as defined in claim 1 further including the step of at least partially retarding the passage of the lumps throughout the treatment zone by establishing and forming a series of sub-zones to facilitate a more complete and efficient treatment of the dough.

5. The process as defined in claim 4 wherein the sub-zone retarding is effected by reversely mounting certain of the working members to effect a partially retarding counterflow effect on the lumps.

6. The process as defined in claim 4 wherein the sub-zone retarding is effected by utilizing partition means to effect a partial dam effect within said treatment zone.

7. The process as defined in claim 4 further including the step of utilizing counter current washing by pumping the wash liquid from one sub-zone and introducing it into another sub-zone.

8. The process as defined in claim 7 further including the step of intermediately cleansing the starch from the wash liquid before reintroducing it into another of the sub-zones.

References Cited

UNITED STATES PATENTS

| 1,083,128 | 12/1913 | Paatz | 127—25 |
| 1,798,811 | 3/1931 | Reimann | 127—25 |
| 2,388,901 | 11/1945 | Callaghan | 127—67 |
| 2,555,908 | 6/1951 | Edeskuty | 127—25 |

MORRIS O. WOLK, Primary Examiner

S. MARANTZ, Assistant Examiner

U.S. Cl. X.R.

127—25